United States Patent
Li

(10) Patent No.: US 9,392,433 B2
(45) Date of Patent: Jul. 12, 2016

(54) METHOD OF DEVICE DISCOVERY IN WIRELESS COMMUNICATION SYSTEMS

(71) Applicant: HTC Corporation, Taoyuan County (TW)

(72) Inventor: Chi-Fang Li, Taoyuan County (TW)

(73) Assignee: HTC Corporation, Taoyuan District, Taoyuan (TW)

(*) Notice: Subject to any disclaimer, the term of this patent is extended or adjusted under 35 U.S.C. 154(b) by 0 days.

(21) Appl. No.: 14/275,818

(22) Filed: May 12, 2014

(65) Prior Publication Data

US 2014/0334337 A1    Nov. 13, 2014

Related U.S. Application Data

(60) Provisional application No. 61/822,004, filed on May 10, 2013.

(51) Int. Cl.
| | | |
|---|---|---|
| *H04W 8/00* | (2009.01) | |
| *H04W 28/08* | (2009.01) | |
| *H04W 74/00* | (2009.01) | |
| *H04L 29/08* | (2006.01) | |
| *H04W 12/02* | (2009.01) | |

(52) U.S. Cl.
CPC ............... *H04W 8/005* (2013.01); *H04L 67/24* (2013.01); *H04W 12/02* (2013.01); *H04W 28/08* (2013.01); *H04W 74/006* (2013.01)

(58) Field of Classification Search
CPC ..... H04W 84/12; H04W 24/00; H04W 68/00; H04W 8/005; H04W 28/08; H04W 74/006; H04W 12/02; H01L 67/24
USPC .......................... 370/254, 312, 328, 329, 331
See application file for complete search history.

(56) References Cited

U.S. PATENT DOCUMENTS

| | | | | |
|---|---|---|---|---|
| 2010/0009675 A1* | 1/2010 | Wijting | ................. | H04W 72/02 455/426.1 |
| 2013/0157670 A1* | 6/2013 | Koskela | .............. | H04W 74/006 455/450 |
| 2013/0188546 A1* | 7/2013 | Turtinen et al. | ................ | 370/312 |
| 2014/0003262 A1* | 1/2014 | He | ........................ | H04W 28/08 370/252 |
| 2014/0066018 A1* | 3/2014 | Zhu | ........................ | H04W 4/008 455/411 |
| 2014/0150067 A1* | 5/2014 | Salkintzis | ............... | H04L 67/24 726/4 |
| 2014/0204898 A1* | 7/2014 | Yang | ...................... | H04W 8/005 370/330 |
| 2014/0206348 A1* | 7/2014 | Johnsson | .............. | H04W 8/005 455/434 |

OTHER PUBLICATIONS

Wi-Fi Alliance Technical Committee P2P Task Group, "Wi-Fi Peer-to-Peer (P2P) Technical Specification", Version 1.1, 2010 Wi-Fi Alliance, pp. 1-159.
"Bluetooth Specification Version 4.0", Covered Core Package version: 4.0, Current Master TOC, Jun. 30, 2010, [vol. 0] p. 1, page 9-26 and p. 43-54, [vol. 1] p. 17-122, [vol. 2] p. 33-332, p. 369-806 and p. 877-945 and [vol. 3] p. 30-378.
3GPP TS 36.211 V11.2.0 (Feb. 2013), "3rd Generation Partnership Project; Technical Specification Group Radio Access Network; Evolved Universal Terrestrial Radio Access (E-UTRA); Physical Channels and Modulation (Release 11)", pp. 1-109.

* cited by examiner

*Primary Examiner* — Chi H Pham
*Assistant Examiner* — Shailendra Kumar
(74) *Attorney, Agent, or Firm* — Winston Hsu; Scott Margo

(57) ABSTRACT

A method of device discovery for a first communication device in a wireless communication system is disclosed. The method comprises connecting to a network of the wireless communication system, sending a discovery request to the network, receiving an allocated resource corresponding to the discovery request from the network, and sending a discovery signal on the allocated resource, whereby a second communication device of the wireless communication system interested in discovery monitors the allocated resource for receiving the discovery signal.

13 Claims, 8 Drawing Sheets

METHOD OF DEVICE DISCOVERY IN WIRELESS COMMUNICATION SYSTEMS

CROSS REFERENCE TO RELATED APPLICATIONS

This application claims the benefit of U.S. Provisional Application No. 61/822,004, filed on May 10, 2013 and entitled "Method and Apparatus for Device Discovery in Communication Systems", the contents of which are incorporated herein in their entirety.

BACKGROUND OF THE INVENTION

1. Field of the Invention

The present invention relates to a method used in a communication device in a wireless communication system, and more particularly, to a method of device discovery in a wireless communication system.

2. Description of the Prior Art

In many communication systems, there are usually at least one kind of nodes serving for central control of radio resource and other kinds of nodes serving for user usage by means of connecting at least a serving node. In 3GPP LTE system of wireless communication system, for example, the mentioned nodes serving for central control are eNBs, relay nodes, radio remote heads (RRH), remote antennas, base stations, etc. Those nodes serving for user usage can be UEs, mobile stations, handsets, user devices, machine type devices (i.e. having capability of communicating with other devices without users), etc.

New direct communications between two user devices are different from conventional communication through eNB. This kind of device-to-device communication is new in wireless communication systems, and there is few information so far. Some similar but different behaviors could be found in Bluetooth and WiFi. However, for those skilled in the art should know these two systems are different from communication systems with central control, e.g. LTE, LTE-Advanced, WCDMA, HSPA, WiMAX, etc. In other words, in current wireless communication systems with central control, there is no mechanism yet for device discovery between two communication devices (i.e. two UEs).

SUMMARY OF THE INVENTION

It is there for an objective to provide a method of device discovery in a wireless communication system to solve the above problem.

The present invention discloses a method of device discovery for a first communication device in a wireless communication system. The method comprises connecting to a network of the wireless communication system, sending a discovery request to the network; receiving an allocated resource corresponding to the discovery request from the network, and sending a discovery signal on the allocated resource, whereby a second communication device of the wireless communication system interested in discovery monitors the allocated resource for receiving the discovery signal.

The present invention discloses a method of device discovery for a communication device in a wireless communication system. The method comprises connecting to a network of the wireless communication system, receiving a resource allocation from the network, receiving a discovery signal on the allocated resource, and determining whether another communication device is discovered according to the reception of the discovery signal.

The present invention discloses a method of device discovery for a network in a wireless communication system. The method comprises receiving a discovery request from a first communication device of the wireless communication system, and in response to the discovery request, allocating at least a resource for the first communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
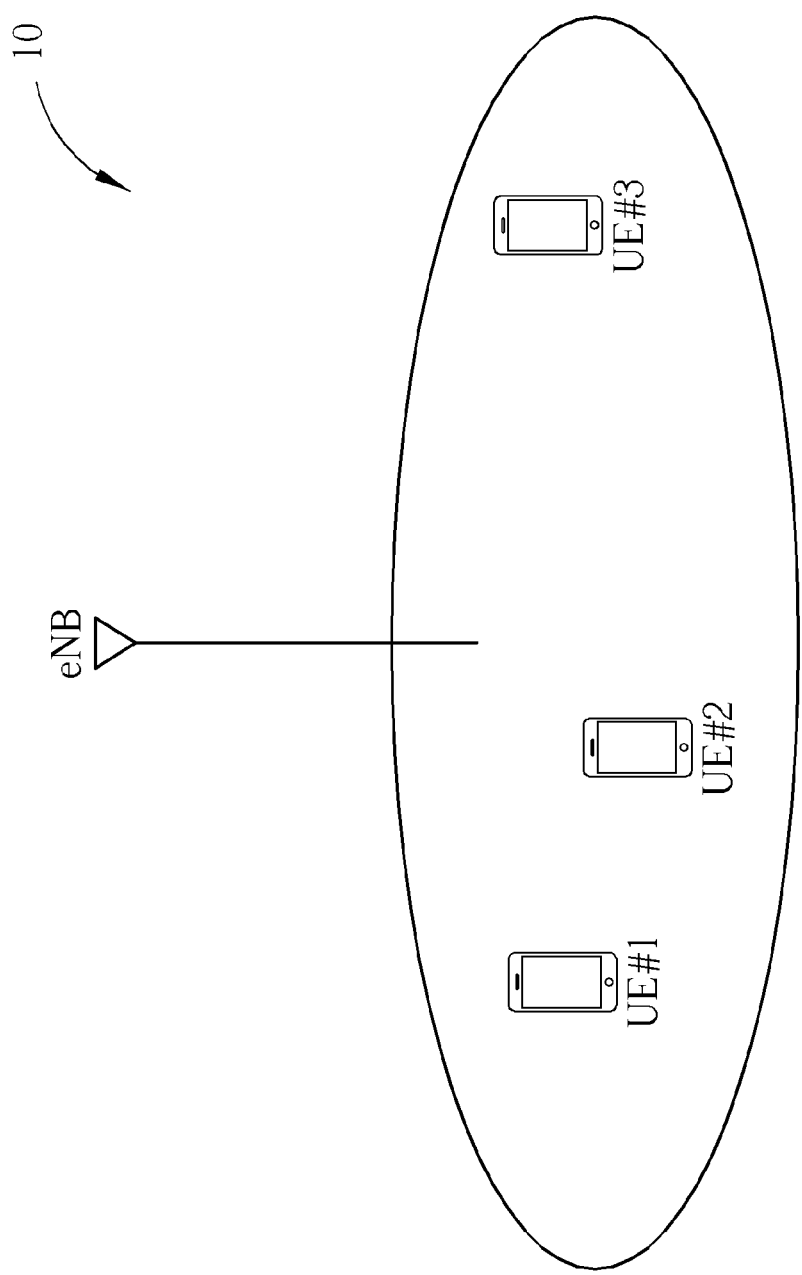
FIG. 1 illustrates a schematic diagram of an exemplary wireless communication system.

Please refer to FIG. 1, which is a schematic diagram of a wireless communication system 10. The wireless communication system 10 is a LTE/LTE-Advanced system or other mobile communication systems, and is briefly composed of a network (i.e. an eNB) and a plurality of user equipments (UEs) UE#1-UE#3 connecting to the eNB. The UEs can be devices such as mobile phones, computer systems, machine type devices, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
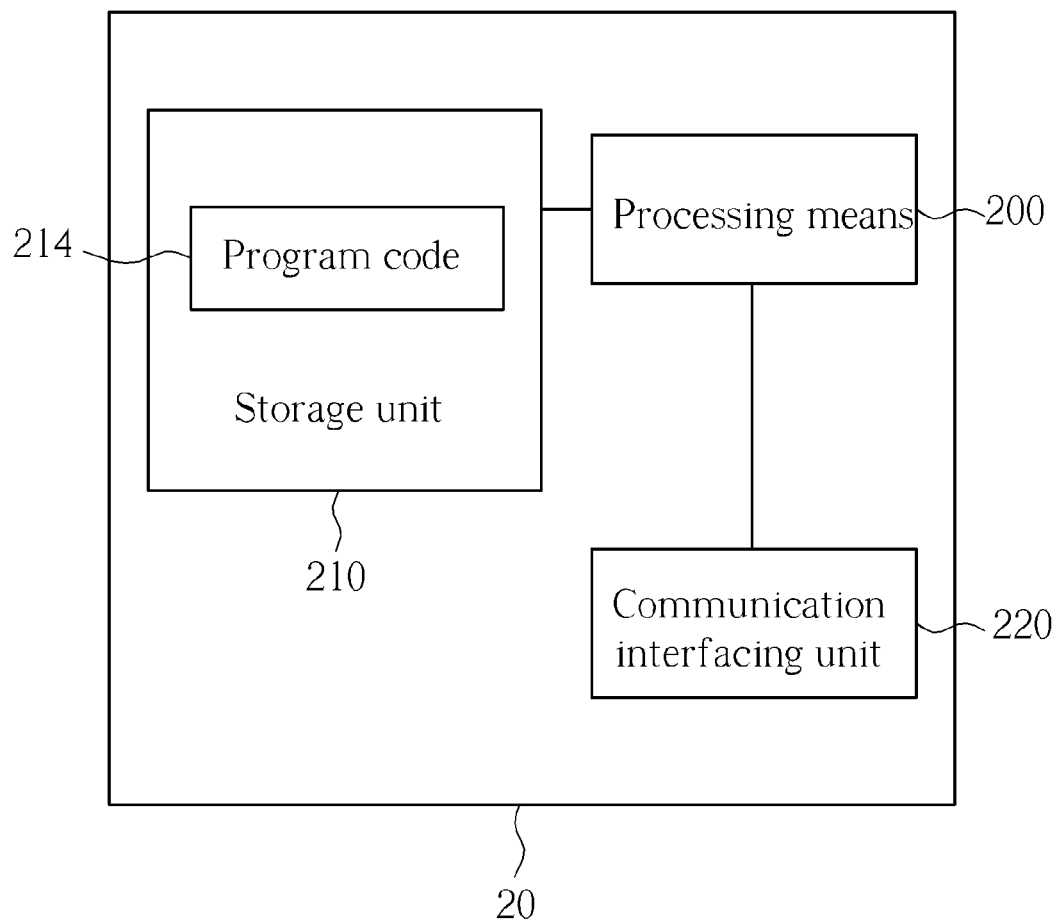
FIG. 2 illustrates a schematic diagram of an exemplary communication device.

FIG. 2 illustrates a schematic diagram of an exemplary communication device 20. The communication device 20 can be the UE or eNB shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
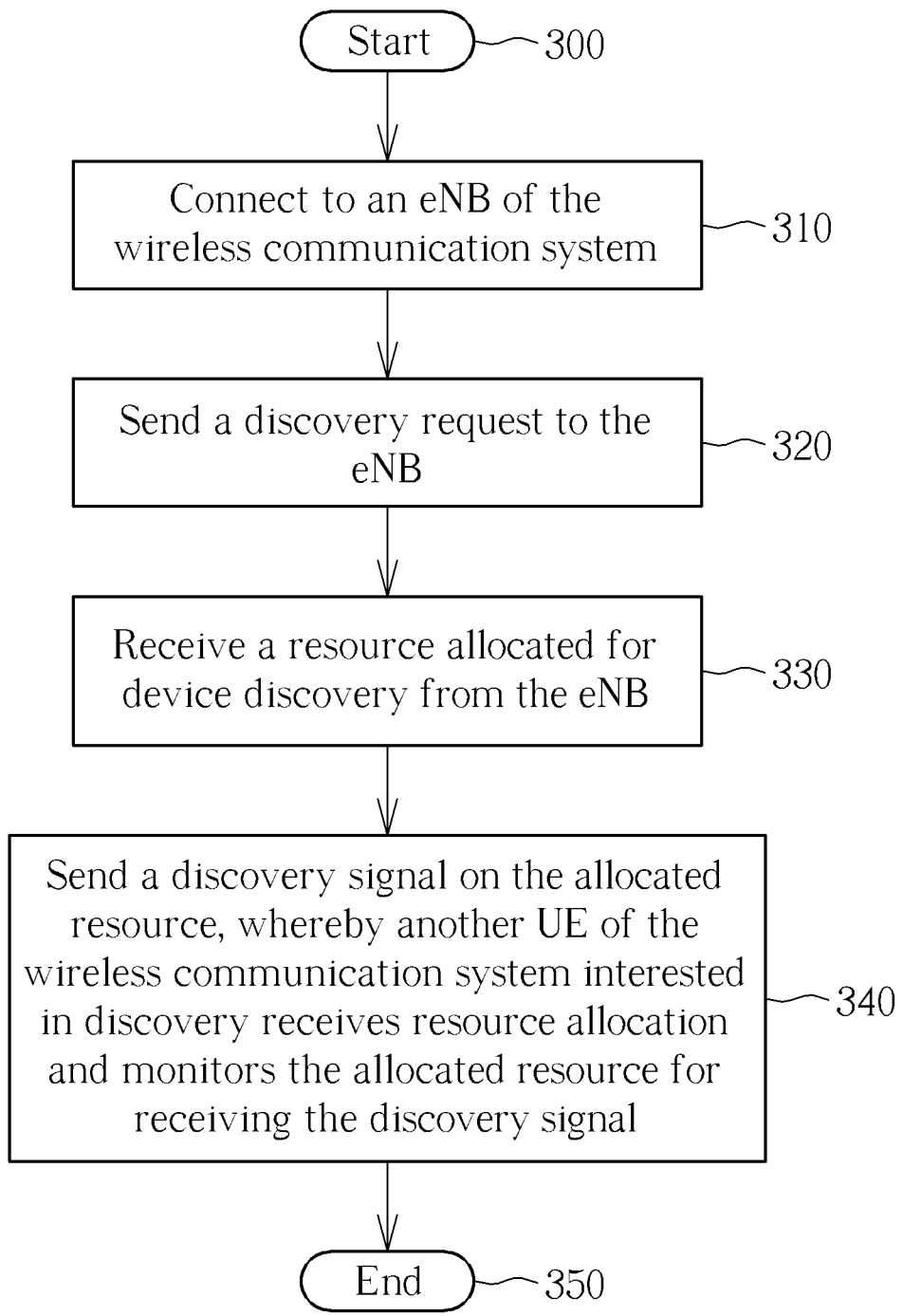
FIG. 3 is a flowchart of an exemplary process according to the present disclosure.

Please refer to FIG. 3, which is a flowchart of a process 30 according to an example of the present disclosure. The process 30 is utilized in the communication device 20 (i.e. a UE) for device discovery. The process 30 may be compiled into a program code 214 to be stored in the storage unit 210, and may include the following steps:

Step 300: Start.

Step 310: Connect to an eNB of the wireless communication system.

Step 320: Send a discovery request to the eNB.

Step 330: Receive a resource allocated for device discovery from the eNB.

Step 340: Send a discovery signal on the allocated resource, whereby another UE of the wireless communication system interested in discovery receives resource allocation and monitors the allocated resource for receiving the discovery signal.

Step 350: End.

According to the process 30, the UE sends a discovery request to the eNB. The eNB allocates at least a resource for the UE after receiving the discovery request, so that the UE can send the discovery signal on the allocated resource. On another hand, another UE, which is interested in searching UEs nearby or search the UE, would receive resource allocation for device discovery and receives the discovery signal at the allocated resource, to discover the UE.

Regarding to resource allocation methods, all uplink and downlink resource allocation approaches in LTE/LTE-Advanced systems, such as resource allocation methods on PDCCH, PDSCH, PBCH, PMCH, PUCCH, PUSCH, RACH, PSS, SSS, SRS, etc., could be possible embodiments. Uplink resource allocation is suitable for device discovery because of low interference from eNB. Another simple approach is that eNB allocates a set of resource pool for device discovery usage. An eNB broadcasts, multicasts, or unicasts the resource allocation of discovery resource pool when the eNB would like to allocate resource for device discovery as a response to UE's request or as generally supported by the eNB.

Figure 4:
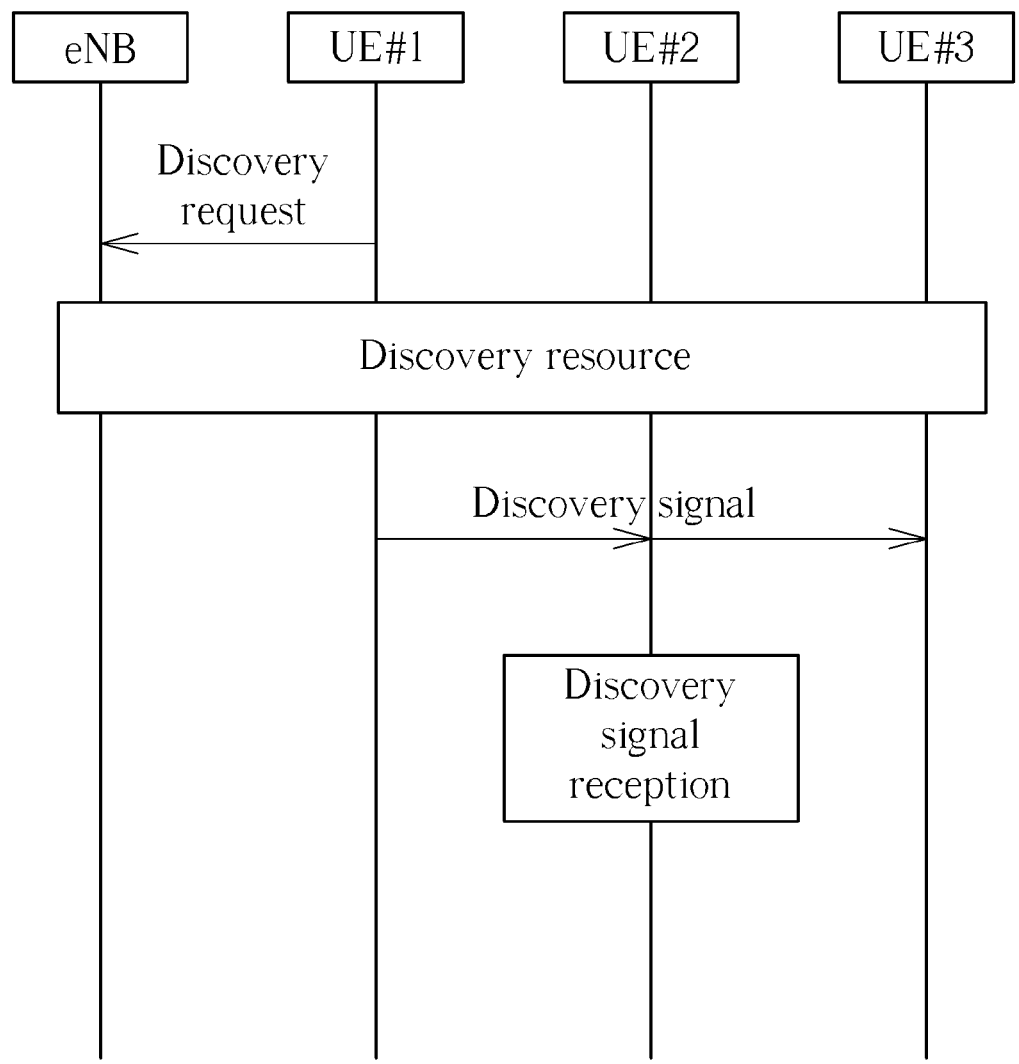
FIG. 4 illustrates a schematic diagram of an embodiment of device discovery.

For detailed device discovery operation, please refer to FIG. 4, which illustrates a schematic diagram of an embodiment of device discovery. The UE#1 sends a discovery request to the eNB. After receiving the discovery request, the eNB allocates resource and sends the resource allocation over air interface to UEs (i.e. the UE#1-UE#3). The UE#1 sends a discovery signal on the allocated resource after receiving the resource allocation. In this embodiment, assume that the UE#2 is interested in searching for UE#1 or other UEs. The UE#2 monitors the discovery resource allocated by the eNB and receives the discovery signal transmitted by the UE#1 on the allocated resource.

Note that, the discovery request sent from the UE#1 to the eNB may include an indication of the device discovery is public to all UEs, available for a group of UEs, or only available for a specific UE. Indication can be carried out by including, a public identification, a group's identification or a specific UE's identification, or by associating group identification or specific UE identification with the indication signal. The association can be carried out by mapping the public, the group or UE identification to a given indication signal. For example, a first indication signal #1 is mapped to a first group ID#1, and a second indication signal #2 is mapped to a second group ID#2. Another method to carry out association is to perform scrambling, correlation, or modulo-2 operation between the signal and an identification or a sequence.

Figure 5:
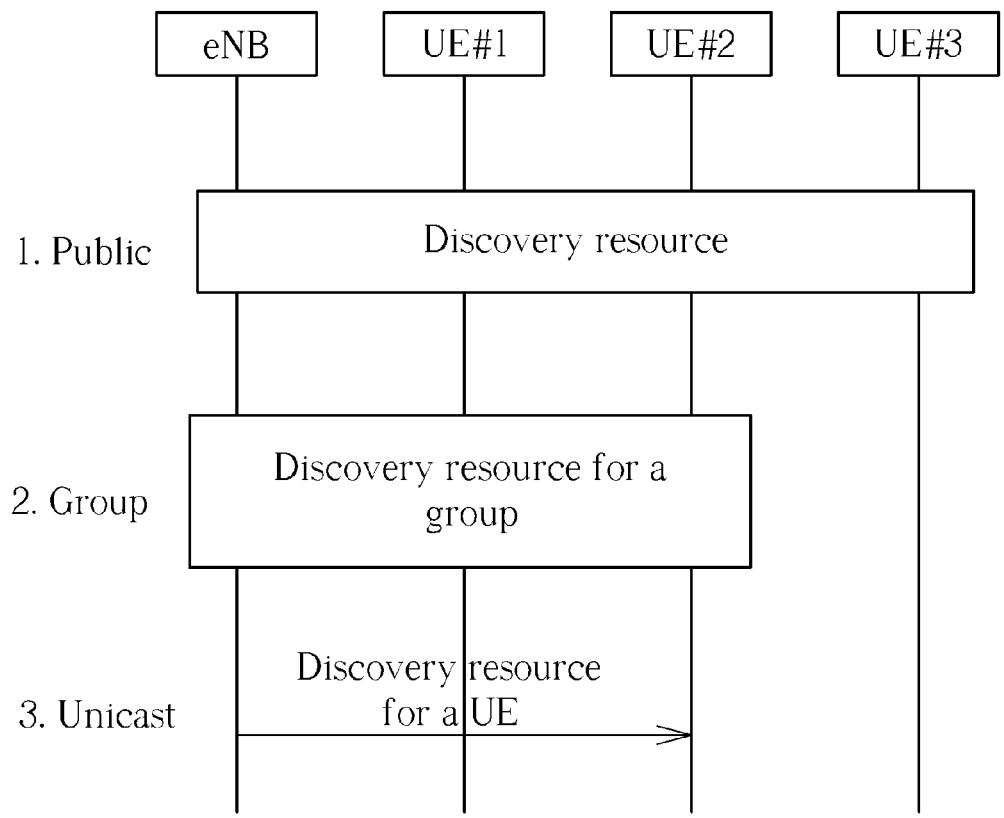
FIG. 5 illustrates a schematic diagram of an embodiment of resource allocation in device discovery.

Transmission of the resource allocation by eNB could be broadcast, multicast, or unicast. Please refer to FIG. 5, which illustrates a schematic diagram of three possible embodiments of the resource allocation for device discovery. As shown in FIG. 5, the eNB may broadcast the resource allocation of discovery for UE#1-UE#3, or multicast the resource allocation of discovery for a group of UE#1-UE#2 with a group identification or by using association with a group identification, or unicast the resource allocation of discovery for UE#2 with identification of UE#2 or by using association with the UE2's identification.

Moreover, the resource allocation of discovery may be dedicated for device discovery usage or also for normal communication with the eNB. For example, the resource allocation for discovery is also used for one of LTE/LTE-Advanced's RACH, PUSCH, PUCCH, SRS, or other uplink channels or signals.

Furthermore, after the UE#2 receives the discovery signal on the uplink resource, the UE#2 determines whether a UE is discovered or not according to the received discovery signal. The determination can be based on received discovery signal strength (e.g. receive power level, RSSI, etc.), power density, signal quality and/or discovery signal content (i.e. the specific sequence, signal, message, etc.). For example, measurement like LTE/LTE-Advanced's Reference Signal Received Power (RSRP), Reference Signal Received Quality (RSRQ), Received Signal Strength Indicator (RSSI), Received Signal Code Power (RSCP), Ec/NO, pilot strength, receiving power, etc. could be used for the determination.

In case of making the discovery signal content for determination, the UE#2, for example, decodes the received discovery signal and identifies whether it is the signal/message sent from the UE#1. If it is, the UE#2 determines UE#1 is discovered. In detail, the discovery signal is a Hadamard sequence, LTE/LTE-Advanced's Primary Synchronization signal (PSS), secondary synchronization signal (SSS), RACH sequence, CRS sequence, MBSFN RS sequence, DMRS sequence in PDSCH, DMRS sequence in EPDCCH, CSI-RS sequence, Positioning RS sequence, DMRS sequence in PUCCH, DMRS sequence in PUSCH, SRS sequence, or suitable modification or part of them. The abovementioned signal (i.e. PSS, SSS) or sequences may associate with a specific cell identification and/or a specific UE identification. Thus, when the UE#1 selects one of the abovementioned signal/sequence for discovery signal, the UE#2 received the discovery signal knows it's the signal sent from the UE#1.

Figure 6:
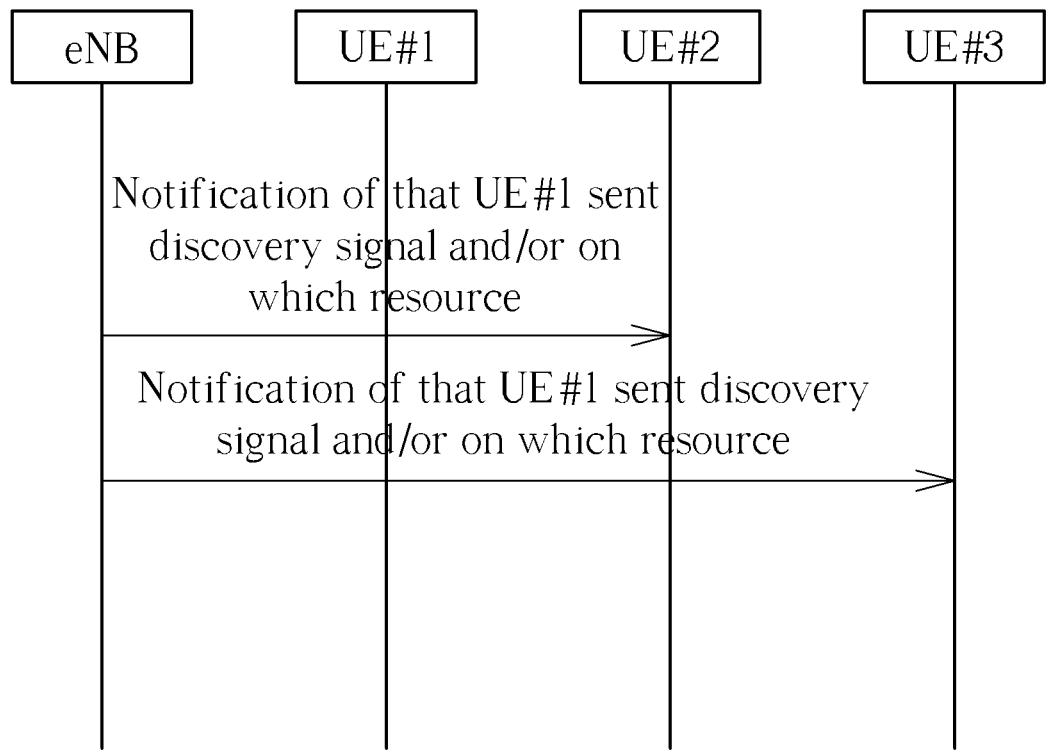
FIG. 6 illustrates a schematic diagram of an embodiment of notification transmission in device discovery.

In another case, the UE#2 makes measurement on the received signal strength, receive power level, RSSI, power density, signal quality, and then compares the measurement result with a threshold, e.g. 3 dB or any difference to distinguish there is a signal sent on that uplink resource for discovery. When the measurement result is large or equal to the threshold, the UE#2 determines that a device is discovered. Note that, if the allocated resource is specific to UE#1, the UE#2 can determine the UE#1 is discovered. However, if the allocated resource is for a group or public, the UE#2 only determines a certain UE is discovered. In this situation, identification for which UE is discovered can be carried out according to which device-specific discovery signal is received, which UE is allocated on the received resource, a notification indicating which UE sent a discovery signal on that received resource from the eNB. Please refer to FIG. 6, which illustrates a schematic diagram of an embodiment of notification transmission in device discovery. The eNB may receive a notification from UE#1 after UE#1 sent a discovery signal on which discovery resource or even detect the discovery signal from the UE#1 on the discovery resource by eNB itself, and then notify UE#2-UE#3 that UE#1 sends the discovery signal on that discovery resource.

In these embodiments, the UE#2 may send the received discovery signal and/or its measurement (e.g. received signal strength, receive power level, RSSI, power density, signal quality) to the eNB to make the determination and corresponding notification to UEs.

Figure 7:
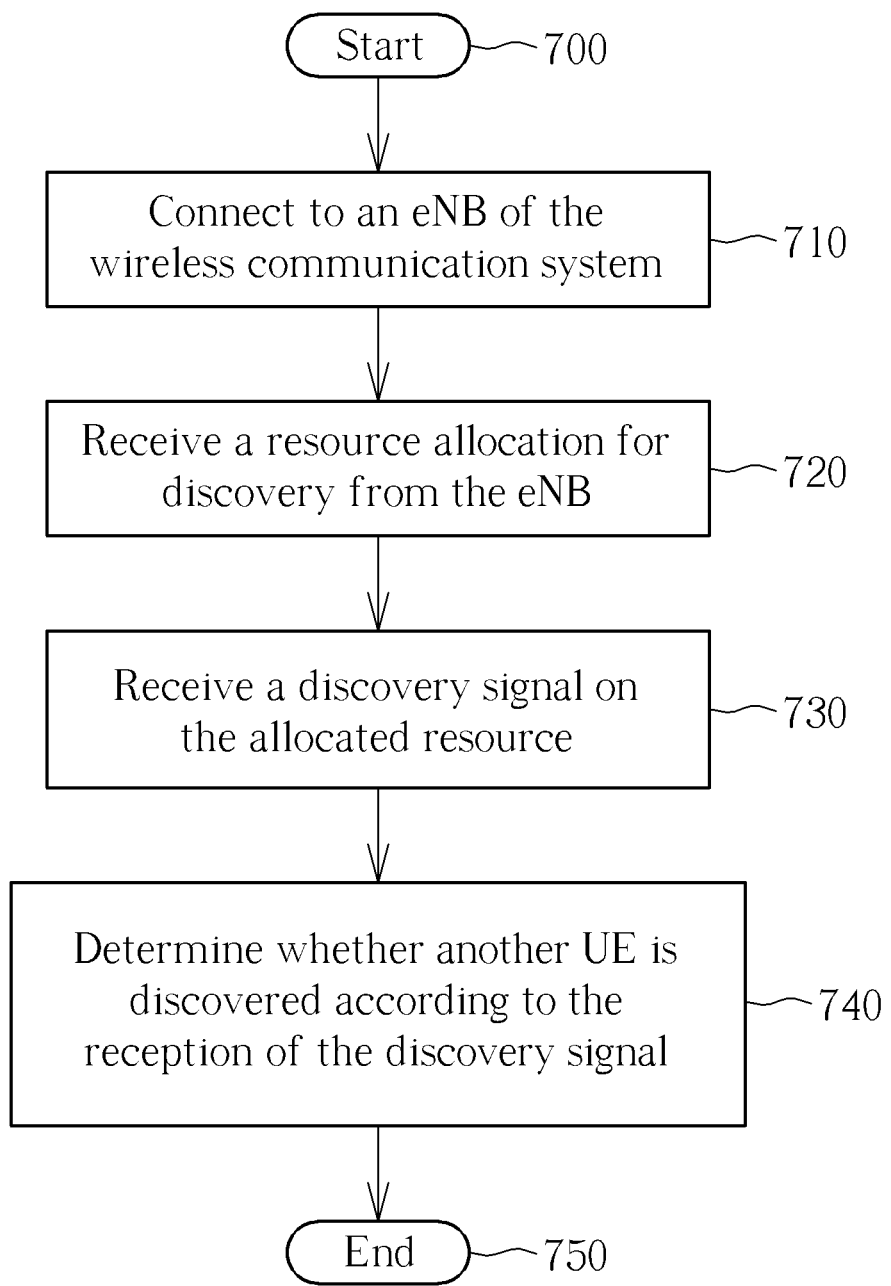
FIGS. 7-8 are flowcharts of an exemplary process according to the present disclosure.

Please refer to FIG. 7, which is a flowchart of a process 70 according to an example of the present disclosure. The process 70 is utilized in the communication device 20 (i.e. a UE) for device discovery. The process 70 may be compiled into a program code 214 to be stored in the storage unit 210, and may include the following steps:

Step 700: Start.

Step 710: Connect to an eNB of the wireless communication system.

Step 720: Receive a resource allocation for discovery from the eNB.

Step 730: Receive a discovery signal on the allocated resource.

Step 740: Determine whether another UE is discovered according to the reception of the discovery signal.

Step 750: End.

According to the process 70 and to the aforementioned, the UE#2 monitors the allocated resource for discovery when receiving the resource allocation of discovery, which may be broadcasted, multicasted, or unicasted by the eNB. Note that, the allocated resource may be dedicated for device discovery usage or also for normal communication with the eNB. For example, the allocated resource for discovery is also used for one of LTE/LTE-Advanced's RACH, PUSCH, PUCCH, SRS, or other uplink transmission. In addition, if the UE#2 receives a discovery signal on the allocated resource, the UE#2 determines whether the UE#1 is discovered according to the reception of the discovery signal. As abovementioned, the determination can be made based on measurement on the at least one of signal strength (i.e. received power level, RSSI), power density, signal quality (i.e. RSRQ) and signal content (i.e. a specific sequence or signal/message) of the received discovery signal. For example, measurement like LTE/LTE-Advanced's Reference Signal Received Power (RSRP), Reference Signal Received Quality (RSRQ), Received Signal Strength Indicator (RSSI), Received Signal Code Power (RSCP), Ec/NO, pilot strength, receiving power, etc. could be used for the determination.

In case of determining by the discovery signal content, for example, the discovery signal is a Hadamard sequence, LTE/LTE-Advanced's Primary Synchronization signal (PSS), secondary synchronization signal (SSS), RACH sequence, CRS sequence, MBSFN RS sequence, DMRS sequence in PDSCH, DMRS sequence in EPDCCH, CSI-RS sequence, Positioning RS sequence, DMRS sequence in PUCCH, DMRS sequence in PUSCH, SRS sequence, or suitable modification or part of them. The abovementioned signal (i.e. PSS, SSS) or sequences may associate with a specific cell identification and/or a specific UE identification. Thus, when the UE#2 receives the discovery signal selected by the UE#1 from the abovementioned signal or sequence, the UE#2 knows it's the signal sent from the UE#1. In other words, the UE#2 determines the UE#1 is discovered according to the signal content of the received discovery signal.

In another embodiment, the UE#2 compares the measurement result associated to discovery signal's strength, power density or signal quality to a threshold, e.g. 3 dB, or any difference to distinguish there is a signal sent on that allocated resource for discovery. When the measurement is large or equal to the threshold, the UE#2 determines that a UE is discovered. Note that, if the allocated resource is specific to the UE#1, the UE#2 determines the UE#1 is discovered. On another hand, if the allocated resource is for a group or public, the UE#2 further identifies which UE is discovered according to which device-specific signal is received (i.e. based on signal content), which UE is allocated on the received resource, or a notification indicating which UE sent a discovery signal on the received resource from the eNB.

In these embodiments, the UE#2 may send the received discovery signal and/or its measurement (e.g. received signal strength, receive power level, RSSI, power density, signal quality) to the eNB to make the determination and corresponding notification to UEs.

Figure 8:
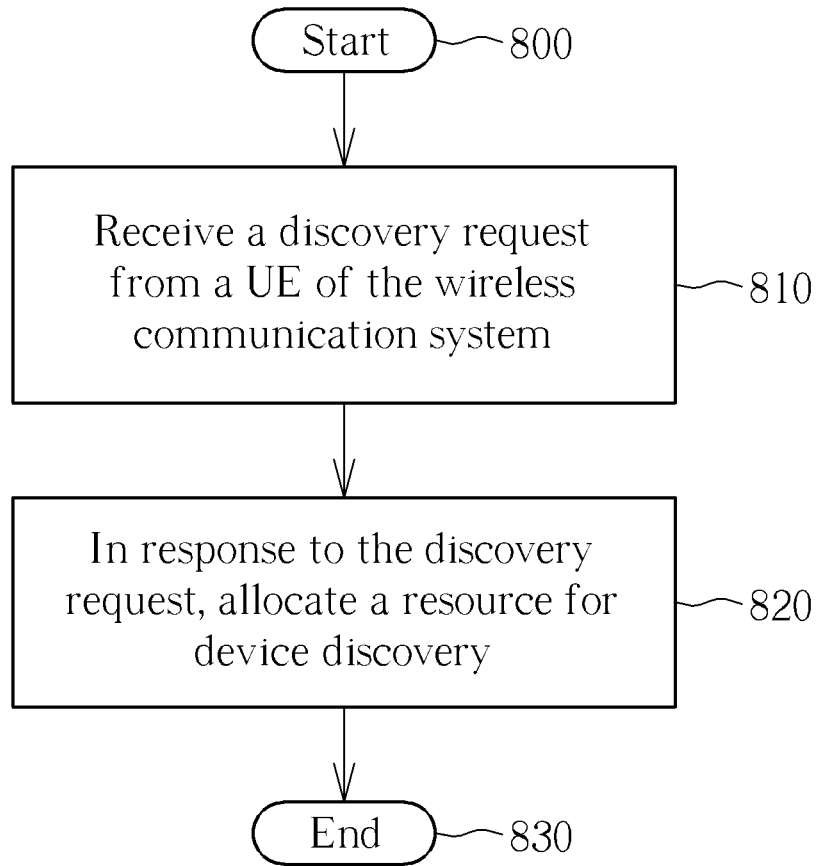

Please refer to FIG. 8, which is a flowchart of a process 80 according to an example of the present disclosure. The process 80 is utilized in the communication device 20 (i.e. an eNB) for device discovery. The process 50 may be compiled into a program code 214 to be stored in the storage unit 210, and may include the following steps:

Step 800: Start.

Step 810: Receive a discovery request from a UE of the wireless communication system.

Step 820: In response to the discovery request, allocate a resource for device discovery.

Step 830: End.

According to the process 80, the eNB allocates the resource for device discovery when receiving the discovery request from the UE#1. The allocated resource may be broadcasted for public, multicasted to a group of UEs, or unicasted to a specific UE. In addition, the allocated resource may be dedicated for device discovery usage or also used for normal communication with the eNB. For example, the allocated resource is also used for one of LTE/LTE-Advanced's RACH, PUSCH, PUCCH, SRS, or other uplink transmission.

On the other hand, the eNB may receive a discovery signal and/or measurement associated to the discovery signal (e.g. received signal strength, receive power level, RSSI, power density, signal quality) from the UE#2. After the eNB receives the discovery signal and/or the measurement, the eNB determines whether a UE is discovered or not according to the received discovery signal and measurement. The determination of whether a UE is discovered and identification of which UE is discovered according to the received discovery signal and measurement can be referred from above, so it is omitted herein.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention provides a clear specification for device discovery in wireless communication system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of device discovery for a network in a wireless communication system, comprising:
 receiving a discovery request from a first communication device of the wireless communication system, wherein the discovery request includes an indication to be discovered by all communication devices, a group of communication devices or a communication device; and in response to the discovery request, determining to broadcast, multicast, or unicast a resource for the first communication device according to the indication of the discovery request.

2. The method of claim 1, further comprising:
receiving at least one of a discovery signal, and a measurement result of the discovery signal from a second communication device of the wireless communication system, wherein the discovery signal is received by the second communication device on the resource; and
determining whether a communication device is discovered according to the at least one of the reception of the discovery signal and the measurement result.

3. The method of claim 2, wherein determining whether a communication device is discovered according to at least one of the reception of the discovery signal and measurement result comprises:
determining whether a communication device is discovered according to at least one of the reception of the discovery signal and measurement result, where the measurement result includes at least one of a discovery signal strength, discovery signal power density, and discovery signal quality.

4. The method of claim 3, wherein determining whether a communication device is discovered according to at least one of the reception of the discovery signal and measurement result including at least one of discovery signal strength, discovery signal power density, and discovery signal quality comprises:
determining a communication device is discovered when the reception of the discovery signal indicates the discovery signal is sent from the first communication device.

5. The method of claim 4, further comprising:
when determining a communication device is discovered, identifying which communication device is discovered according to which device-specific discovery signal is received, which communication device is allocated on the resource, or a report from a communication device which sent a discovery signal on the resource.

6. The method of claim 3, wherein determining whether a communication device is discovered according to at least one of the reception of the discovery signal and measurement result including at least one of discovery signal strength, discovery power density, and discovery signal quality of the received discovery signal comprises:

comparing the measurement result with a threshold; and
determining the first communication device is discovered when the measurement result is larger or equal to the threshold.

7. The method of claim 3, further comprising:
when determining a communication device is discovered, identifying which communication device is discovered according to which device-specific discovery signal is received, which communication device is allocated on the resource, or a report from a communication device which sent a discovery signal on the received resource.

8. The method of claim 2, wherein the discovery signal is a Hadamard sequence, Primary Synchronization signal (PSS), secondary synchronization signal (SSS), RACH sequence, CRS sequence, MBSFN RS sequence, DMRS sequence in PDSCH, DMRS sequence in EPDCCH, CSI-RS sequence, Positioning RS sequence, DMRS sequence in PUCCH, DMRS sequence in PUSCH, or SRS sequence in LTE/LTE-Advanced systems.

9. The method of claim 3, wherein the discovery signal is associated with at least one of an identification of a cell and an identification of a communication device.

10. The method of claim 1, further comprising:
receiving a discovery signal from the first communication device on the resource; and
notifying that the first communication device sends the discovery signal on the resource, to a second communication device of the wireless communication device interested in discovery.

11. The method of claim 1, wherein the resource is dedicated for device discovery usage or overlapped with a resource for normal communication with the network.

12. The method of claim 11, wherein the resource for normal communication with the network is used for one of LTE/LTE-Advanced's RACH, PUSCH, PUCCH, SRS, or other uplink transmission.

13. The method of claim 2, further comprising:
when determining a communication device is discovered, identifying which communication device is discovered according to which device-specific discovery signal is received, which communication device is allocated on the resource, or a report from a communication device which sent a discovery signal on the resource.

* * * * *